(12) United States Patent
Nagai et al.

(10) Patent No.: US 8,765,007 B2
(45) Date of Patent: Jul. 1, 2014

(54) METHOD OF EVALUATING POSITIVE ELECTRODE ACTIVE MATERIAL

(75) Inventors: Hiroki Nagai, Nagoya (JP); Hidekazu Hiratsuka, Moriguchi (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 97 days.

(21) Appl. No.: 13/521,241

(22) PCT Filed: Jan. 15, 2010

(86) PCT No.: PCT/JP2010/050429
§ 371 (c)(1),
(2), (4) Date: Jul. 10, 2012

(87) PCT Pub. No.: WO2011/086690
PCT Pub. Date: Jul. 21, 2011

(65) Prior Publication Data
US 2013/0047721 A1    Feb. 28, 2013

(51) Int. Cl.
*H01M 4/02* (2006.01)
*H01M 4/13* (2010.01)

(52) U.S. Cl.
USPC ..................................... 252/182.1

(58) Field of Classification Search
USPC ..................... 252/182.1; 429/209
See application file for complete search history.

(56) References Cited

U.S. PATENT DOCUMENTS

| | | |
|---|---|---|
| 2004/0253516 A1 | 12/2004 | Yuasa et al. |
| 2006/0083989 A1 | 4/2006 | Suhara et al. |

FOREIGN PATENT DOCUMENTS

| | | |
|---|---|---|
| JP | 10-106561 | 4/1998 |
| JP | 11-45711 | 2/1999 |
| JP | 2001-85006 | 3/2001 |
| JP | 2003-229124 | 8/2003 |
| JP | 2005-5105 | 1/2005 |
| JP | 2008-153017 | 7/2008 |
| JP | 2008-266136 | 11/2008 |
| WO | WO 01-04975 A1 | 1/2001 |
| WO | WO 2004/082046 A1 | 9/2004 |
| WO | WO 2005/020354 A1 | 3/2005 |

OTHER PUBLICATIONS

International Search Report in International Application No. PCT/JP2010/050429; Mailing Date: Apr. 20, 2010.
Howard, W.F. et al., "Theoretical evaluation of high-energy lithium metal phosphate cathode materials in Li-ion batteries," Journal of Power Sources, 165, (2007), pp. 887-891.
Reisner, D.E. et al., "Nickel hydroxide and other nanophase cathode materials for rechargeable batteries," Journal of Power Sources. 65. (1997), pp. 231-233.
Sun et al., "Effect of degree of crystallization on the cycle performance of spinel $LiMn_2O_4$," Battery BiMonthly, vol. 39, No. 2, p. 74-76, Apr. 2009.

*Primary Examiner* — Helen O Conley
(74) *Attorney, Agent, or Firm* — Finnegan, Henderson, Farabow, Garrett & Dunner, LLP (57) ABSTRACT

A method of evaluating a positive electrode active material has a density ratio-determining step of determining a ratio of an apparent density Da of the positive electrode active material to a theoretical density Db of the positive electrode active material. For example, when the positive electrode active material contains no closed space in the positive electrode active material, such as closed pores of the positive electrode active material, the ratio (Da/Db) of the apparent density Da of the positive electrode active material to the theoretical density Db of the positive electrode active material will be a value close to 1; however, the more the closed space such as the closed pores exists in the positive electrode active material, the smaller the ratio (Da/Db). Thus, the ratio (Da/Db) can serve as an indicator for measuring the degree of density of the positive electrode active material.

7 Claims, 8 Drawing Sheets

METHOD OF EVALUATING POSITIVE ELECTRODE ACTIVE MATERIAL

CROSS-REFERENCE TO RELATED APPLICATIONS

This application is a national phase application of International Application No. PCT/JP2010/050429, filed Jan. 15, 2010, the content of which is incorporated herein by reference.

TECHNICAL FIELD

The present invention relates to a method of evaluating a positive electrode active material. More particularly, the invention relates to a method of evaluating positive electrode active material used for lithium-ion secondary batteries.

BACKGROUND ART

Examples of known positive electrode active materials used for lithium-ion secondary batteries include composite oxides of lithium and a transition metal, such as $LiCoO_2$, $LiNiO_2$, $LiMn_2O_4$, and $LiMnO_2$.

In Published PCT Application 04/082046 (WO 2004/082046), it has been proposed that the compression failure strength should be increased for a lithium-nickel-cobalt-manganese composite oxide powder for positive electrodes. According to the publication, a lithium-nickel-cobalt-manganese composite oxide for positive electrodes of lithium secondary batteries can be obtained that has a high volumetric capacity density and sufficiently satisfies the requirements for safety, cycle performance, and high-current discharge capability.

In Published PCT Application 05/020354 (WO 2005/020354), it has been proposed to use both a first composite oxide powder having a compression failure strength and a second composite oxide powder having a compression failure strength at a certain proportion for a lithium-nickel-cobalt-manganese composite oxide powder for positive electrodes for lithium secondary batteries having a certain composition, to synergistically form a positive electrode with a high filling density. According to the publication, it is described that a positive electrode having a high volumetric capacity density can be thereby obtained synergistically, and such a high volumetric capacity density of the positive electrode can be accomplished without spoiling other characteristics that are necessary for the positive electrode, such as volumetric capacity density, safety, cycle performance, and high-current discharge capability.

JP 2008-266136 A proposes a lithium-nickel-cobalt-manganese-containing composite oxide prepared in the following manner. An aqueous solution of a nickel-cobalt-manganese salt, an aqueous solution of an alkali metal hydroxide, and an ammonium ion supplying substance are supplied consecutively or intermittently to a reaction system, the temperature of the reaction system is set at an almost constant temperature within the range of 30° C. to 70° C., and they are caused to react with each other in a condition in which the pH is kept almost at a constant value within the range of from 10 to 13. Nickel-cobalt-manganese composite hydroxide aggregate particles are synthesized, in which primary particles obtained by depositing nickel-cobalt-manganese composite hydroxide are aggregated to form secondary particles. Further, an oxidizing agent is reacted with the just-mentioned composite hydroxide aggregate particles to synthesize nickel-cobalt-manganese composite oxyhydroxide aggregate particles. Then, at least the just-mentioned oxyhydroxide and a lithium salt are dry-blended and baked to obtain the lithium-nickel-cobalt-manganese-containing composite oxide.

CITATION LIST

Patent Literature

[Patent Document 1] Published PCT Application 04/082046
[Patent Document 2] Published PCT Application 05/020354
[Patent Document 3] JP 2008-266136 A

SUMMARY OF INVENTION

Technical Problem

In particular, the lithium-ion secondary batteries for vehicles are required to have the battery performance that can meet various requirements, such as the charge-discharge capacity corresponding to vehicle's total mileage, the cycle performance corresponding to vehicle's lifetime, and the output power characteristics for driving the vehicle, at the same time. Accordingly, such performance as to achieve the just-described battery performance of the lithium-ion secondary battery is required for the positive electrode active material for the lithium-ion secondary batteries for vehicles. For example, in Patent Documents 1 and 2, the positive electrode active materials are evaluated in terms of compression failure strength. However, it is not necessarily clear that whether the compression failure strength is an appropriate evaluation indicator as the condition for satisfying the charge-discharge capacity, the cycle performance, and the output power characteristics at the same time.

The present inventors have been conducting assiduous studies on positive electrode active materials containing a lithium-transition metal composite oxide to improve the battery performance of lithium-ion secondary batteries, such as charge-discharge capacity, cycle performance, and output power characteristics. The present inventors have been paying special attention to the specific surface area of a positive electrode active material to improve the battery performance. The specific surface area indicates the surface area of the capacity per unit weight of the positive electrode active material. It is believed that when the specific surface area is large, the reaction area per unit weight is accordingly large, resulting in good reactivity of the positive electrode active material. However, in reality, no correlation has been observed between the specific surface area of the positive electrode active material and the battery performance of lithium-ion secondary batteries. In view of such circumstances, the present invention proposes a novel method of evaluating a positive electrode active material used for lithium-ion secondary batteries.

Solution to Problem

According to the present invention, a method of evaluating a positive electrode active material has a density ratio-determining step of determining the ratio of the apparent density Da of the positive electrode active material to the theoretical density Db of the positive electrode active material. The ratio determined by the density ratio-determining step indicates the degree of density of the positive electrode active material, and by evaluating the positive electrode active material based on the ratio, a positive electrode active material having desired performance can be obtained, for example.

The apparent density Da may be a density measured by a gas displacement-type pycnometer. The theoretical density Db may be a density (Dbm/Dbv) obtained by dividing a mass Dbm per unit lattice volume of the positive electrode active material by the unit lattice volume Dbv of the positive electrode active material.

A method of manufacturing a lithium-ion secondary battery containing a positive electrode active material may have a step of verifying a ratio of an apparent density Da of the positive electrode active material to a theoretical density Db of the positive electrode active material is equal to or greater than a predetermined reference value. This makes it possible to evaluate the positive electrode active material used for lithium-ion secondary batteries appropriately, so that the performance of the lithium-ion secondary batteries can be improved. In this case, the predetermined reference value the ratio (Da/Db) of the apparent density Da of the positive electrode active material to the theoretical density Db of the positive electrode active material may be 0.90.

A positive electrode active material for a lithium-ion secondary battery may have a ratio (Da/Db) of an apparent density Da to a theoretical density Db equal to or greater than 0.90. A lithium-ion secondary battery may contain a positive electrode active material having a ratio (Da/Db) of an apparent density Da to a theoretical density Db equal to or greater than 0.90.

DESCRIPTION OF EMBODIMENTS

Hereinbelow, one embodiment of the method of evaluating a positive electrode active material according to the present invention will be described. It should be noted that the present invention is not limited to the following embodiments. In the drawings, like parts and components performing like functions are denoted by like reference signs.

<<Positive Electrode Active Material>>

The positive electrode active material is used mainly for lithium-ion secondary batteries. The positive electrode active material contains, for example, a lithium-transition metal composite oxide. Examples of the lithium-transition metal composite oxide include $LiCoO_2$, $LiNiO_2$, $LiNi_xCo_yO_2$, $LiMn_2O_4$, and $LiMnO_2$.

The lithium-transition metal composite oxide also includes a lithium-nickel-cobalt-manganese composite oxide represented by the general formula (I):

$$Li_{1+m}Ni_pCo_qMn_rM^1{}_sO^2. \qquad (I)$$

In the foregoing formula (I), $M^1$ is one or more elements selected from the group consisting of B, V, Mg, Al, Sr, Ti, Zr, Mo, Nb, W, Cr, Fe, Cu, Zn, Ga, In, Sn, La, and Ce.

In the formula (I), m, p, q, r, and s are: $0 \leq m \leq 0.2$, $0.1 \leq p \leq 0.6$, $0 \leq q \leq 0.5$, $0 \leq r \leq 0.5$, $0 \leq s \leq 0.02$, respectively, and $p+q+r+s=1$. In a preferable embodiment, $0 \leq s < p$, and s may be substantially 0 (i.e., an oxide substantially free of $M^1$). It should be noted that the foregoing formula (I) represents the composition at the time of constructing the battery (in other words, the composition of the positive electrode active material used for manufacturing the battery). This composition is almost the same as the composition when the battery is fully discharged. Such a lithium-transition metal composite oxide typically forms a crystal having a hexagonal close-packed structure and forms a microparticle (primary particle) having a layered structure. It also forms a secondary particle in which such microparticles (primary particles) are aggregated.

The method of evaluating a positive electrode active material according to this embodiment can be applied suitably to, for example, a positive electrode active material containing closed pores. The positive electrode active material is not limited to the examples above, and is not necessarily limited to lithium-transition metal composite oxide. The positive electrode active material may include a lithium phosphate compound (for example, lithium iron phosphate ($LiFePO_4$). The crystal structure of the positive electrode active material is not limited to the hexagonal close-packed structure. For example, $LiMn_2O_4$ may have what is called a spinel-type crystal structure. The subject of the method of evaluating a positive electrode active material may include $LiMn_2O_4$. Thus, the positive electrode active material to which the method of evaluating a positive electrode active material can be applied may include various types of positive electrode active materials used for lithium-ion secondary batteries.

Figure 1:
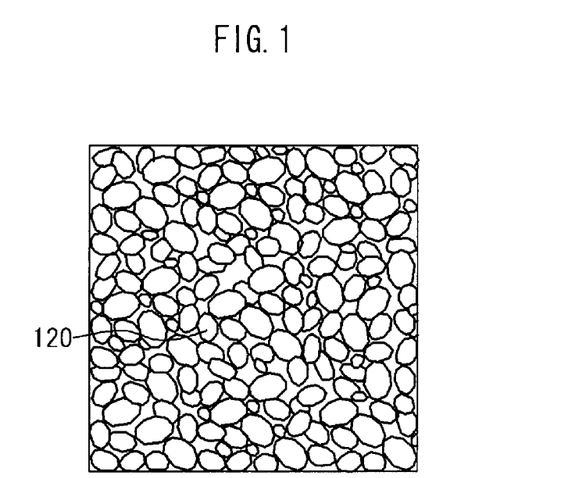
FIG. 1 is a schematic view illustrating powder of a lithium-transition metal composite oxide.
Figure 2:
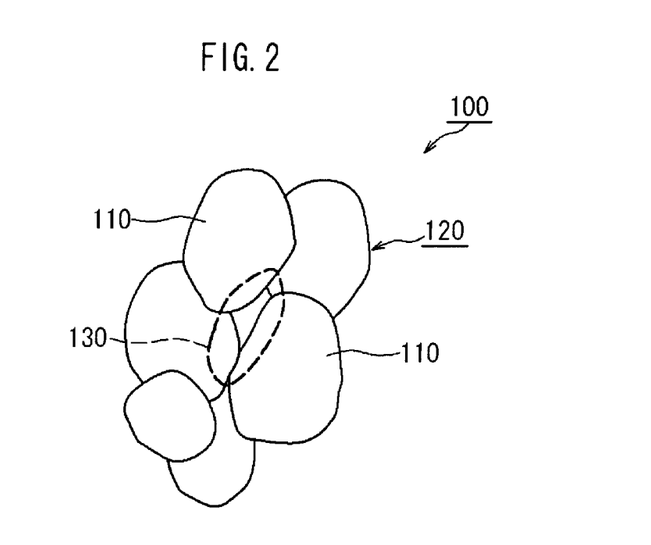
FIG. 2 is a schematic view illustrating primary particles of the lithium-transition metal composite oxide.
Figure 3:
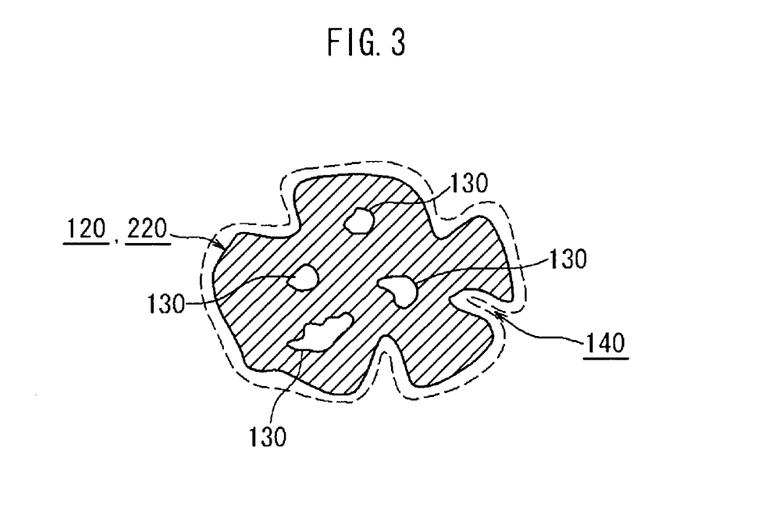
FIG. 3 is a cross-sectional view illustrating a secondary particle of the lithium-transition metal composite oxide.

The present inventors have studied the relationship between the specific surface areas of positive electrode active materials and the battery performance (such as charge-discharge capacity, cycle performance, and output power characteristics) of the lithium-ion secondary batteries prepared using the positive electrode active materials. As a result, no correlation was observed between the specific surface area of the positive electrode active material and the battery performance of the lithium-ion secondary battery. The present inventors have investigated the cause of the phenomenon and have paid special attention to the particle structure of lithium-transition metal composite oxide. FIG. 1 is a schematic view illustrating powder of a lithium-transition metal composite oxide. FIG. 2 is a schematic view illustrating primary particles of the lithium-transition metal composite oxide. FIG. 3 is a cross-sectional view illustrating a secondary particle of the lithium-transition metal composite oxide. As illustrated in FIG. 2, lithium-transition metal composite oxide 100 aggregates to a certain degree to form a primary particle 110. The primary particles 110 further aggregate to form a secondary particle 120. Still further, the lithium-transition metal composite oxide 100 is a powder in which the secondary particles 120 are aggregated. In the lithium-transition metal composite oxide 100, the powder in which the secondary particles 120 are aggregated may have closed pores 130 (i.e., space that is not connected to outside) formed therein, as illustrated in FIGS. 2 and 3, for example.

The present inventors have considered that the portion in which the closed pores are formed does not release or absorb lithium ions (Li), and does not contribute to the battery performance substantially. Moreover, since the positive electrode active material releases and absorbs lithium ions (Li) during charge and discharge, it expands and contracts in volume repeatedly. In addition, the present inventors have considered that when the closed pores are formed in the positive electrode active material, the battery is likely to undergo deterioration over time since, for example, the positive electrode active material is likely to suffer from fractures because of the expansion and shrinkage. The present inventors have also considered that even among lithium-transition metal composite oxides of the same type, variations occur in the proportion in which closed pores are formed, depending on the conditions of formation, for example.

<<Density Ratio>>

Based on these findings, the present inventors have considered that in order to evaluate the positive electrode active material more properly, it is appropriate to use an indicator that takes into consideration the presence of the closed pores in the positive electrode active material. Thus, the present inventors propose an indicator "density ratio" as the indicator that takes into consideration the presence of the closed pores. Herein, the density ratio is the ratio (Da/Db) of the apparent density Da of the positive electrode active material to the theoretical density Db of the positive electrode active material. It should be noted that although the density ratio is defined as (Da/Db), it is also possible to carry out substantially the same evaluation when the reciprocal thereof (Db/Da) is used as the density ratio. In this embodiment, the positive electrode active materials used for lithium-ion secondary batteries are evaluated using such density ratio (Da/Db).

<<Apparent Density Da of the Positive Electrode Active Material>>

Figure 4A:
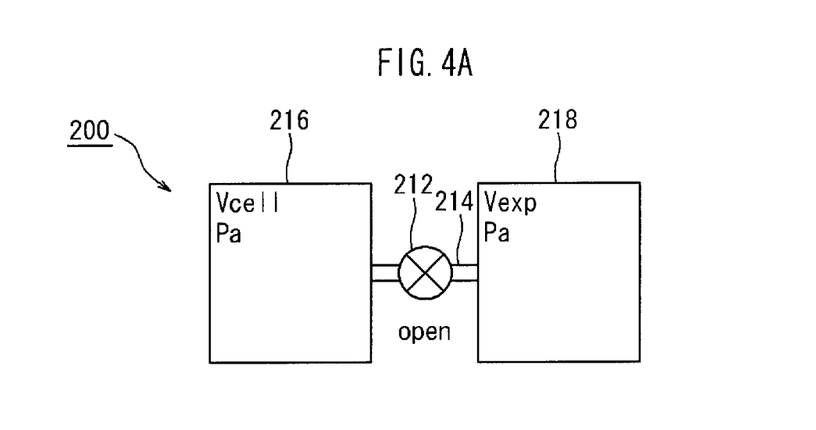
FIG. 4A is a process drawing illustrating the principle of the measurement using a gas displacement-type pycnometer.
Figure 4B:
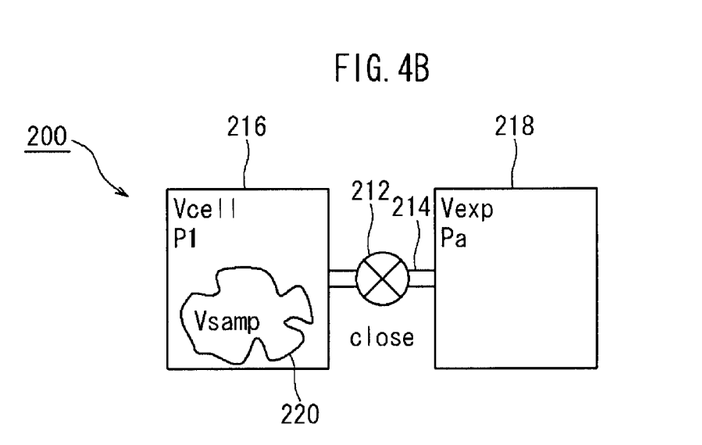
FIG. 4B is a process drawing illustrating the principle of the measurement using a gas displacement-type pycnometer.
Figure 4C:
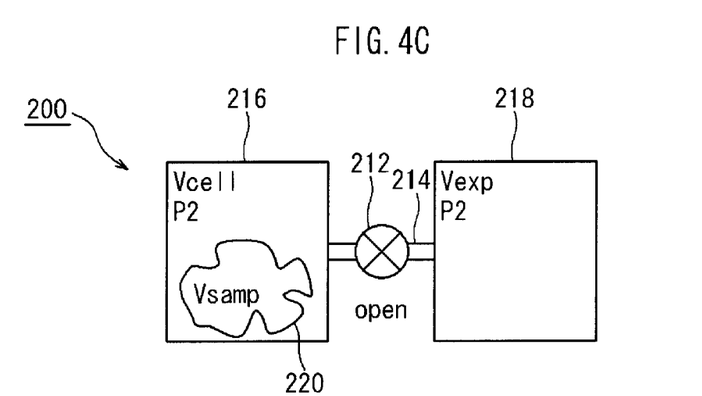
FIG. 4C is a process drawing illustrating the principle of the measurement using a gas displacement-type pycnometer.

The apparent density Da of the positive electrode active material is such a density that when closed pores 130 (space that is not connected to outside) are formed inside as illustrated in FIG. 2, the closed pores 130 are regarded as being included in the volume of the positive electrode active material. Such an apparent density Da of the positive electrode active material can be obtained with a gas displacement-type pycnometer, for example. Here, the measurement method using the gas displacement-type pycnometer is such that the volume of the gas substituted by the positive electrode active material in a hermetically sealed system is considered as being equal to the volume of the positive electrode active material. FIGS. 4A through 4C show process drawings illustrating the process of the principle of the measurement with the gas displacement-type pycnometer.

As illustrated in FIGS. 4A to 4C, for example, a gas displacement-type pycnometer 200 has a sample chamber 216 and an expansion chamber 218 that are allowed to communicate with each other by a pipe 214 having a valve 212. It is assumed that the volume $V_{cell}$ of the sample chamber 216 and the volume $V_{exp}$ of the expansion chamber 218 are known. First, as illustrated in FIG. 4A, the valve 212 is opened so that the pressure in the system will be Pa. Next, as illustrated in FIG. 4B, the valve 212 is closed, a sample 220 (positive electrode active material) is fed in the sample chamber 216 while helium gas is filled in the sample chamber 216 so that the pressure in the sample chamber 216 is increased to P1. Next, as illustrated in FIG. 4C, the valve 212 is opened so that the sample chamber 216 and the expansion chamber 218 will have a uniform pressure P2.

Here, the volume $V_{samp}$ of the sample 220 is determined by the following equation (II):

$$\text{Volume } V_{samp} = V_{cell} - [V_{exp}/\{(P1-Pa)/(P2-Pa)-1\}]. \quad (II)$$

Then, the mass of the sample 220, which has been determined separately, is divided by the volume $V_{samp}$ determined in the just-described way. Thus, the density of the sample 220 can be obtained.

Here, as illustrated in FIG. 3, a gas can enter cavities 140 of the outer surface of the sample 220, for example, which are connected to outside. For this reason, the gas displacement-type pycnometer can evaluate the volume of the sample 220 (the positive electrode active material) excluding the portion that gas can enter (for example, the cavities 140). However, when the sample 220 (the positive electrode active material) has the closed pores 130 (space that is not connected to outside), the gas cannot reach the closed pores 130 from outside. For this reason, in the measurement result by the gas displacement-type pycnometer, the closed pores 130 are regarded as part of the volume of the sample 220 (the positive electrode active material). As a consequence, when the sample 220 contains the closed pores 130, the gas displacement-type pycnometer evaluates the density of the sample 220 as smaller corresponding to the size of the closed pores 130. The density evaluated with the volume of the closed pores 130 regarded as being included in the volume of the sample 220 (the positive electrode active material) is referred to as "apparent density Da" herein.

As the gas displacement-type pycnometer, for example, the dry-type density analyzers "Accupyc series" made by Shimadzu Corp. may be adopted. Thus, in this embodiment, the apparent density Da is determined using the above-described gas displacement-type pycnometer. To measure the apparent density Da, it is sufficient to employ a measurement method by which the closed pores 130 can be regarded as being included in the volume, and it is not always necessary to use the gas displacement-type pycnometer. For example, it is possible to adopt a method in which the sample is immersed in liquid to measure the volume.

<<Theoretical Density Db of the Positive Electrode Active Material>>

Next, the theoretical density Db of the positive electrode active material will be explained. The theoretical density Db of the positive electrode active material is a density that is determined theoretically. Such an theoretical density Db of the positive electrode active material can be obtained based on, for example, the crystal structure and the molecular weight. Here, the crystal structure of the positive electrode active material can be determined by, for example, X-ray diffraction analysis. The molecular weight of the positive electrode active material can be obtained by, for example, the compositional formula. The theoretical density Db of the positive electrode active material can be determined as the density (Dbm/Dbv) obtained by dividing the mass Dbm per unit lattice volume of the positive electrode active material by the unit lattice volume Dbv of the positive electrode active material. This can be represented by the following equation. Db=(mass per unit crystal lattice: Dbm)/(volume of unit crystal lattice: Dbv).

For example, in the case of a lithium-transition metal composite oxide having a hexagonal close-packed structure as described above, the theoretical density is determined by the following equations (III) to (V).

Mass per unit crystal lattice: $Dbm$ (g)=3×molecular weight $M$/6.02×10$^{23}$  (III);

Volume of unit crystal lattice: $Dbv$ (cm$^3$)=lattice volume $V$×10$^{-24}$  (IV);

Theoretical density $Db$ of the positive electrode active material (g/cm$^3$)=$Dbm$/$Dbv$=3×molecular weight $M$×10$^{24}$/6.02×10$^{23}$/lattice volume $V$  (V).

Here, the unit for the lattice volume V is cubic centimeter (cm$^3$), and the number "6.02×10$^{23}$" is Avogadro constant. Molecular weight M is the molecular weight of a lithium-transition metal composite oxide determined by the compositional formula of the lithium-transition metal composite oxide, and the number "3×molecular weight M" represents the molecular weight contained in the unit crystal structure. The following equation (III) shows the case in which the crystal structure of the positive electrode active material is a hexagonal close-packed structure. When the crystal structure of the positive electrode active material is different, the equation for determining the theoretical density Db of the positive electrode active material will be different accordingly.

The density ratio (Da/Db) is determined as the ratio of the apparent density Da of the positive electrode active material to the theoretical density Db of the positive electrode active material. When the positive electrode active material contains no closed space such as the closed pores 130, the density ratio (Da/Db) will be a value close to 1. However, the more the positive electrode active material contains the closed space such as the closed pore 130, the smaller the value of the ratio (Da/Db) will be. Therefore, the density ratio (Da/Db) can serve as an indicator for measuring the degree of density of the positive electrode active material.

When a positive electrode active material has a density ratio (Da/Db) close to 1, it means that the positive electrode active material has a smaller proportion of the closed pores 130 and is therefore expected to have a greater contribution to an improvement in the battery performance as a whole. In addition, it is believed that the positive electrode active material having a density ratio (Da/Db) close to 1 has a dense structure with a small proportion of the closed pores 130. It is believed that such a positive electrode active material has high durability against the load during charge and discharge and can improve the cycle performance. The present inventors have found that the performance of the positive electrode for lithium-ion secondary batteries can be improved by verifying that the density ratio (Da/Db) of the positive electrode active material is equal to or greater than a predetermined reference value. The method of evaluating a positive electrode active material evaluates a positive electrode active material based on the novel indicator, the density ratio (Da/Db). With the density ratio (Da/Db), a positive electrode active material having desired performance can be obtained.

It should be noted that in this embodiment, the density ratio is the ratio (Da/Db) of the apparent density Da of the positive electrode active material to the theoretical density Db of the positive electrode active material. It is, however, also possible to employ the reciprocal thereof (Db/Da). In the case that the density ratio (Db/Da) is employed, the density ratio will be a value close to 1 when the positive electrode active material contains no closed space such as the closed pores 130 (see FIG. 3); however, the more the positive electrode active material contains closed space such as the closed pores 130, the greater than 1 the density ratio will be. Therefore, the density ratio (Db/Da) can serve as an indicator for measuring the degree of density of the positive electrode active material.

By using the above-described gas displacement-type pycnometer in the step of determining the apparent density Da, the closed pores 130 can be regarded as being included in the volume, so that the apparent density Da can be determined appropriately. The theoretical density Db may be determined as the density (Dbm/Dbv) obtained by dividing the mass Dbm per unit lattice volume of the positive electrode active material by the unit lattice volume Dbv of the positive electrode active material, as described above. In this way, the density ratio (Da/Db) can be obtained as an appropriate indicator corresponding to the size of the closed space in the positive electrode active material, such as the closed pores 130.

Such a method of evaluating a positive electrode active material can be applied to a method of manufacturing a lithium-ion secondary battery. For example, it is preferable that a method of manufacturing a lithium-ion secondary battery containing a positive electrode active material have a step of verifying a ratio of an apparent density Da of the positive electrode active material to a theoretical density Db of the positive electrode active material is equal to or greater than a predetermined reference value. Since the method of manufacturing a lithium-ion secondary battery has the above-described step, it is possible to selectively use a positive electrode active material having an appropriate proportion of the closed pores 130, so that desirable performance can be ensured for the lithium-ion secondary battery.

As a result of various investigations, the present inventors believe that the battery performance of the lithium-ion secondary battery, such as charge-discharge capacity, cycle performance, and output power characteristics, can be improved by selectively using a positive electrode active material wherein the ratio (Da/Db) of the apparent density Da to the theoretical density Db≥0.90. Such a lithium-ion secondary battery is particularly suitable for lithium-ion secondary batteries for vehicles, which require high charge-discharge capacity, high cycle performance, and high output power characteristics.

One example of the method of evaluating a positive electrode active material will be shown below. Here, a plurality of types of lithium-nickel-cobalt-manganese composite oxides were prepared with varying composition ratios of nickel (Ni), cobalt (Co), and manganese (Mn), and with or without an additional element (Zr). Table 1 lists samples a through i.

TABLE 1

| Sample | z1 Composition Ni/Co/Mn ratio | z2 Additional element | z3 Li/Me | z4 Particle size D50 μm | z5 BET m$^2$/g | z6 Apparent density Da g/cc | z7 Theoretical density Db g/cc | z8 Density ratio (Da/Db) — | z9 Initial reaction resistance Ω | z10 Post-cycling reaction resistance increase times | z11 Capacity retention ratio % |
|---|---|---|---|---|---|---|---|---|---|---|---|
| a | 33/33/33 | — | 1.15 | 6.5 | 0.56 | 4.583 | 4.783 | 0.958 | 2.5 | 0.99 | 92.1 |
| b | | Zr | 1.15 | 4.2 | 0.91 | 4.580 | 4.777 | 0.959 | 2.1 | 1.01 | 92.8 |
| c | | — | 1.15 | 4.7 | 1.14 | 4.357 | 4.771 | 0.913 | 2.0 | 1.02 | 92.7 |
| d | | — | 1.13 | 5.9 | 0.85 | 4.376 | 4.773 | 0.917 | 2.2 | 1.01 | 91.8 |

TABLE 1-continued

| Sample | z1 Composition Ni/Co/Mn ratio | z2 Additional element | z3 Li/Me | z4 Particle size D50 μm | z5 BET m²/g | z6 Apparent density Da g/cc | z7 Theoretical density Db g/cc | z8 Density ratio (Da/Db) — | z9 Initial reaction resistance Ω | z10 Post-cycling reaction resistance increase times | z11 Capacity retention ratio % |
|---|---|---|---|---|---|---|---|---|---|---|---|
| e | 40/30/30 | Zr | 1.10 | 5.9 | 0.95 | 4.510 | 4.774 | 0.945 | 1.9 | 0.98 | 91.9 |
| f | 50/25/25 | Zr | 1.10 | 6.0 | 0.92 | 4.656 | 4.767 | 0.977 | 1.8 | 0.99 | 92.0 |
| g | 33/33/33 | — | 1.15 | 6.4 | 0.57 | 4.291 | 4.786 | 0.897 | 3.1 | 1.62 | 82.2 |
| h | 40/30/30 | Zr | 1.13 | 6.1 | 0.79 | 4.248 | 4.773 | 0.890 | 3.0 | 1.82 | 79.1 |
| i | 50/25/25 | Zr | 1.10 | 5.7 | 0.88 | 4.288 | 4.768 | 0.899 | 2.9 | 1.92 | 79.5 |

In Table 1, column z1 "Composition" shows the composition ratios of nickel (Ni), cobalt (Co), and manganese (Mn) of the lithium-nickel-cobalt-manganese composite oxides. Column z2 "additional element" shows whether or not an addition element is added. In the examples shown in Table 1, the dash "-" shown in column z2 of "additional element" indicates that no additional element is contained. On the other hand, "Zr" shown in column z2 for "Additional element" indicates that "Zr: zirconia" is added as the additional element. Table 1 shows that the samples b, e, f, h, and i contain Zr (zirconia).

Figure 5:
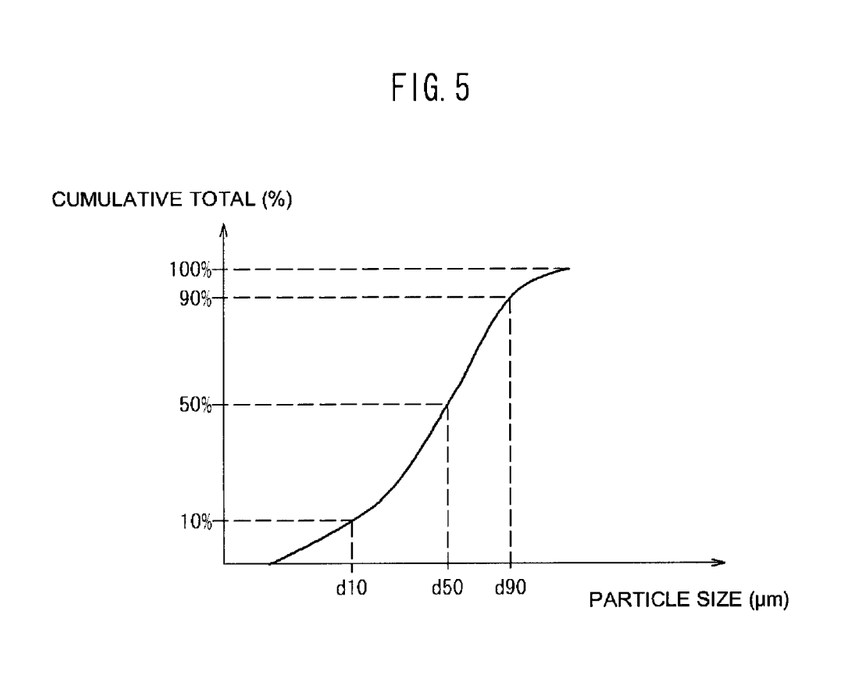
FIG. 5 is a graph illustrating cumulative distribution of particle size of a positive electrode active material.

Column z3 "Li/Me" in Table 1 shows the mole ratio of lithium (Li) to transition metals (Ni, Co, and Mo) for each of the samples a through i (lithium-nickel-cobalt-manganese composite oxides). Column z4 "Particle size D50" in Table 1 shows the particle size D50 for each of the samples a through i. Here, the particle size D50 is defined as a particle size at which, when each of the samples a through i is classified at a certain particle size into two parts, one part with larger particles and the other part with smaller particles, the larger part and the smaller part are in equal proportions. FIG. 5 is a graph illustrating the cumulative particle size distribution of a positive electrode active material. As shown in FIG. 5, the particle size D50 is equal to the particle size (median size) at which the cumulative percentage is 50% in the cumulative particle size distribution of the positive electrode active material. Column z5 "BET" in Table 1 shows the specific surface area of each of the samples a through i. Here, the specific surface area is determined by a gas adsorption method. For the adsorption gas, it is possible to use nitrogen gas, for example.

Column z6 "Apparent density Da" in Table 1 shows the apparent density Da of each of the samples a through i. Here, the apparent density Da is a measurement value determined by a gas displacement density analyzer "Accupyc 1330" made by Shimadzu Corp. Column z7 "Theoretical density Db" in Table 1 shows the theoretical density Db of each of the samples a through i. Here, the crystal structure of each of the samples a through i was analyzed by X-ray diffraction analysis, and based on the result, the theoretical density Db of each of the samples a through i was determined. Column z8 "Density ratio (Da/Db)" in Table 1 shows the density ratio (Da/Db) of each of the samples a through i. Here, it is obtained by dividing the value of "Apparent density Da" in column z6 by the value of "Theoretical density Db" in column z7.

Column z9 "Initial reaction resistance," column z10 "Post-cycling reaction resistance increase," and column z11 "Capacity retention ratio" in Table 1 show the values obtained for the lithium-ion secondary batteries that are prepared using the samples a through i.

<<Construction of Lithium-Ion Secondary Battery>>

First, the samples of the positive electrode active materials, acetylene black as a conductive agent, and PVDF were mixed with NMP so that the mass ratio of these materials would be 89:8:3, and the concentration of the solid content (NV) would be about 40 mass %, to prepare respective positive electrode compositions corresponding to the samples a through i.

Each of these positive electrode compositions was coated on both sides of a long aluminum foil (current collector) with a thickness of 15 μm and then dried, to form a positive electrode mixture layer. The coating amount of the composition (based on the solid content) was adjusted to about 12.8 g/m² in total of the two sides. In this way, respective sheet-shaped positive electrodes (positive electrode sheets) corresponding to the samples a through i were prepared.

In addition, natural graphite, SBR, and CMC were mixed with ion exchange water so that the mass ratio of these materials would be 98:1:1 and the NV would be 45 mass %, to prepare a water-based active material composition (negative electrode mixture composition). This composition was coated on both sides a long copper foil (negative electrode current collector) with a thickness of about 15 μm and then dried, to thereby form a negative electrode mixture layer. In this way, a sheet-shaped negative electrode (negative electrode sheet) was prepared.

The positive electrode sheet and the negative electrode sheet prepared in the foregoing manner were layered with two long separators (each made of a porous polyethylene sheet), and the layered sheet was wound in the longitudinal direction to prepare a wound electrode assembly. This electrode assembly was enclosed in an outer case together with a non-aqueous electrolyte solution, to construct a 18650-type lithium-ion secondary battery. The non-aqueous electrolyte solution used had a composition in which $LiPF_6$ was dissolved at a concentration of 1 mol/L in a mixed solvent containing EC, DMC, and EMC at a volume ratio of 3:3:4. All the prepared 18650-type lithium-ion secondary batteries were constructed under the same conditions, except for the samples a through i used as the positive electrode active material.

<<Initial Reaction Resistance>>

Figure 6:
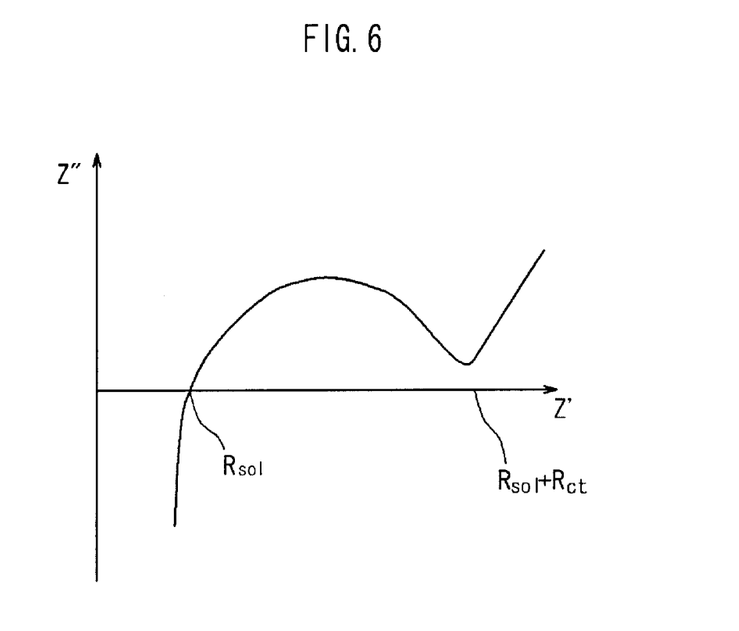
FIG. 6 is a graph illustrating the measurement results of equivalent circuit fitting using Cole-Cole plot in alternating current impedance measurement of a lithium-ion secondary battery.

The lithium-ion secondary batteries constructed in the foregoing manner are subjected to an appropriate conditioning process. The conditioning process is an initial charge-discharge process as follows. For example, the battery is subjected to an operation in which it is constant-current charged at a charge rate of 1/10 C for 3 hours and further constant-current charged at a charge rate of 1/3 C to 4.1 V. Then, the battery is subjected to an operation in which it is constant-current discharged at a discharge rate of 1/3 C to 3.0 V. These operations are repeated two or three times. After performing such a conditioning process, an alternating current impedance measurement is carried out at a measurement temperature of 25° C., within a measurement frequency range of from 0.001 Hz to 10000 Hz, and at an amplitude of 5 mV. FIG. 6 shows the measurement results of equivalent circuit fitting using Cole-Cole plot in the alternating current impedance measurement.

As illustrated in FIG. 6, direct current resistance Rsol and reaction resistance Rct (initial reaction resistance) were determined by the equivalent circuit fitting using Cole-Cole plot in the alternating current impedance measurement. The results are shown in column z9 of Table 1.

<<Capacity Retention Ratio>>

The battery having undergone the just-described conditioning was charged with a constant current of 1 C (1 A herein) under the temperature condition of 25° C. until the terminal voltage became 4.1 V, and subsequently charged with a constant voltage until the total charge time reached 2 hours. This battery having undergone the CC-CV charging was kept at 25° C. for 24 hours and thereafter discharged at 25° C. from 4.1 V to 3.0 V with a constant current of 1 C. Subsequently, the battery was discharged with a constant voltage until the total discharge time reached 2 hours, and then the discharge capacity (initial capacity) was measured. Next, a charging operation in which the battery is charged from 3.0 V to 4.1 V with a constant current of 2 C and a discharging operation in which the battery is discharged from 4.1 V to 3.0 V with a constant current of 2 C were repeated alternately for 1000 cycles at 60° C. The battery having undergone the charge-discharge cycles was discharged at 25° C. from 4.1 V to 3.0 V with a constant current of 1 C and subsequently discharged with a constant voltage until the total discharge time reached 2 hours, and the discharge capacity at that time (i.e., the capacity after cycling) was measured. Then, the capacity retention ratio (%) after the 1000-cycle charge-discharge was determined using the following equation:

Capacity retention ratio (%)={(Capacity after cycling)/(Initial capacity)}×100.

<<Post-Cycling Reaction Resistance Increase>>

For the battery having undergone the just-described charge-discharge cycling, an alternating current impedance measurement was carried out in the same manner as described above, and from the Cole-Cole plot obtained, the direct current resistance Rsol and the reaction resistance Rct (post-cycling reaction resistance) were determined. Then, the post-cycling reaction resistance increase was obtained by dividing the value of the post-cycling reaction resistance by the value of the initial reaction resistance. The post-cycling reaction resistance increase values obtained in this way are shown in column z10 of Table 1.

Herein, the closer the "post-cycling reaction resistance increase" is to 1, the more the initial performance (especially the cycle performance and the output power characteristics) of the lithium-ion secondary battery is maintained. In addition, the closer the "capacity retention ratio" is to 100%, the initial battery performance (charge-discharge capacity) of the lithium-ion secondary battery is maintained. As shown in Table 1, it was observed that for each of the samples a through i, the density ratio (Da/Db) was more correlated to the initial reaction resistance (z9), the post-cycling reaction resistance increase (z10), and the capacity retention ratio (z11) than to, for example, the specific surface area (BET).

The present inventors have also found as a result of various studies that when the density ratio (Da/Db) was 0.9 or higher, significantly desirable results were obtained for the initial reaction resistance (z9), the post-cycling reaction resistance increase (z10), and the capacity retention ratio (z11). Accordingly, the present inventors believe that the battery performance, such as charge-discharge capacity, cycle performance, and output power characteristics, of the lithium-ion secondary battery can be improved by selectively using a positive electrode active material in which the density ratio (Da/Db)≥0.90. Such a lithium-ion secondary battery is particularly suitable for lithium-ion secondary batteries for vehicles, which require high charge-discharge capacity, high cycle performance, and high output power characteristics.

Hereinabove, the method of evaluating a positive electrode active material according to one embodiment of the present invention has been described, but the method of evaluating a positive electrode active material according to the invention is not limited to the above-described examples.

For example, the method for determining the density ratio (Da/Db), for example, how to obtain the apparent density Da and the theoretical density Db, is not limited to the above-described examples. In addition, the battery construction is not particularly restricted. Preferable examples of the use of the above-described positive electrode active material include a positive electrode in which a positive electrode mixture having the above-described positive electrode active material as its main component (that is, the component that accounts for 50 mass %, typically the component that accounts for 75 mass %) is retained by a current collector, and a lithium-ion secondary battery having the just-described positive electrode.

For the material for forming the current collector (positive electrode current collector), electrically conductive metal materials such as aluminum may be adopted suitably, like conventional lithium secondary batteries. The shape of the positive electrode current collector is not particularly limited because it may vary depending on the shape of the battery that is to be constructed using the above-described positive electrode. For example, it may be in various shapes, such as a rod shape, a plate shape, a sheet shape, a foil shape, and a mesh shape. The techniques disclosed herein may be suitably applied to a positive electrode for a lithium secondary battery in which a positive electrode mixture layer is provided on a sheet-shaped or foil-shaped current collector, and to a lithium secondary battery using the just-mentioned positive electrode as a constituent component. A preferable embodiment of such a lithium secondary battery is a battery in which an electrode assembly (a wound electrode assembly) containing a sheet-shaped positive electrode and a sheet-shaped negative electrode being wound with sheet-shaped separators typically is enclosed together with an appropriate non-aqueous electrolyte (typically a liquid electrolyte, i.e., an electrolyte solution) in an outer case. The external shape of the battery is not particularly limited and may be, for example, rectangular parallelepiped, flat-shaped, or cylindrical.

The positive electrode mixture may contain any component such as a conductive agent and a binder as necessary, in addition to the positive electrode active material (typically in particulate form). As the conductive agent, it is possible to employ, as appropriate, the same kind of conductive agent used for the positive electrode of a common lithium secondary battery. Examples of the conductive agent include carbon materials, such as carbon powder and carbon fiber, and electrically conductive metal powder, such as nickel powder. It is possible to use one of the just-mentioned examples of the conductive agents either alone or in combination with another one or more of the examples. Examples of the carbon powder include various types of carbon blacks (such as acetylene black, furnace black, and Ketjen Black) and graphite powder. Among these, acetylene black and/or furnace black may be used preferably.

It is preferable that the proportion of the positive electrode active material in the entire positive electrode mixture be approximately 50 mass % or more (typically from 50 mass % to 95 mass %), and generally more preferably from about 70 mass % to about 95 mass % (e.g., from 75 mass % to 90 mass %). The proportion of the conductive agent in the entire positive electrode mixture may be from about 2 mass % to about 20 mass %, generally preferably from about 2 mass % to about 15 mass %. In a composition that uses a binder, the proportion of the binder in the entire positive electrode mixture may be from about 1 mass % to about 10 mass %, generally preferably from about 2 mass % to about 5 mass %.

The operation of forming a positive electrode mixture layer on a positive electrode current collector may be conducted in the following manner. For example, a positive electrode composition in which the above-described positive electrode active material and other desired components (conductive agent, binder, etc.) are dispersed in an appropriate solvent is prepared (purchased or manufactured), and the composition (typically a composition in paste form or in slurry form) is provided (typically coated) on a surface of the current collector and dried. As the solvent, either an aqueous solvent or a non-aqueous solvent can be used. A suitable example of the non-aqueous solvent is N-methyl-2-pyrrolidone (NMP).

As the binder, it is possible to employ, as appropriate, the same kind of binder used for the positive electrode of a common lithium secondary battery. It is preferable to select a polymer that is soluble or dispersible in the solvent used. Preferable examples of the binder that may be used in a positive electrode composition using an aqueous solvent include water-soluble or water-dispersible polymers including: cellulose-based polymers such as carboxymethylcellulose (CMC) and hydroxypropyl methyl cellulose (HPMC); polyvinyl alcohol (PVA); fluororesins such as polytetrafluoroethylene (PTFE) and tetrafluoroethylene-hexafluoropropylene copolymer (FEP); vinyl acetate copolymers; and rubber materials such as styrene-butadiene rubber (SBR), acrylic acid-modified SBR resin (SBR latex). Preferable examples of the binder that may be used in a positive electrode composition using a non-aqueous solvent include polymers such as polyvinylidene fluoride (PVDF) and polyvinylidene chloride (PVDC). The just-mentioned examples of the polymer materials can be used for the purpose of obtaining the function as an addition agent, such as a thickening agent, for the above-described composition, in addition to the function as a binder.

The operation of providing the positive electrode composition on the sheet-shaped current collector may be suitably conducted using a conventionally known appropriate coating apparatus (such as slit coater, die-coater, comma coater, and gravure coater). The positive electrode composition in an appropriate amount is coated in a predetermined area of at least one side (typically both sides) of the current collector and then dried, and pressed in a thickness direction as needed, whereby a sheet-shaped positive electrode (positive electrode sheet) having targeted properties can be obtained. For the method of pressing, it is possible to employ conventionally known pressing techniques, such as a roll pressing method and a flat plate pressing method, as appropriate.

Hereinbelow, examples of the lithium-ion secondary battery that has a positive electrode having the above-described structure will be described.

First Embodiment

Figure 7:
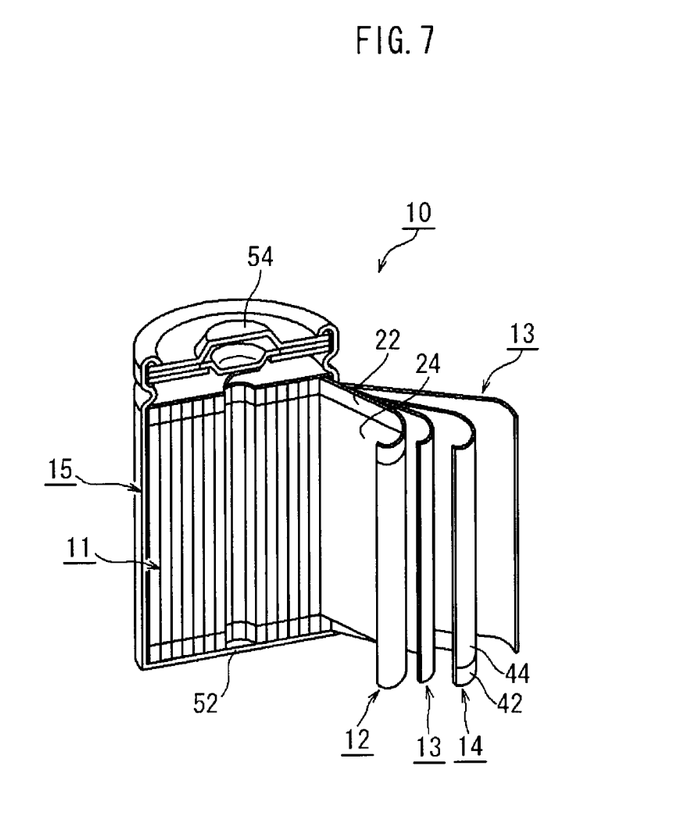
FIG. 7 is a schematic view illustrating a lithium-ion secondary battery according to a first embodiment.

FIG. 7 shows a schematic configuration of a lithium-ion secondary battery according to a first embodiment. This lithium-ion secondary battery 10 includes an electrode assembly 11 having a positive electrode 12 and a negative electrode 14 that are enclosed in a battery case 15 having a shape that can enclose the electrode assembly, together with a non-aqueous electrolyte solution, which is not shown in the drawings. The battery case 15 has a closed-end cylindrical case main body 52 and a lid 54 that closes the opening. Both the lid 54 and the case main body 52 are made of a metal, and they are insulated from each other and electrically connected to positive and negative electrode current collectors 22 and 42, respectively. That is, in the lithium-ion secondary battery 10, the lid 54 also serves as the positive electrode terminal, and the case main body 52 is also serves as the negative electrode terminal.

The electrode assembly 11 is formed by winding a positive electrode 12 (positive electrode sheet) and a negative electrode 14 (negative electrode sheet) with two sheets of long sheet-shaped separators 13. The positive electrode 12 has a positive electrode mixture layer 24 provided on a long sheet-shaped positive electrode current collector 22 and containing any one of the positive electrode active materials disclosed herein. The negative electrode 14 has a negative electrode mixture layer 44 provided on a long sheet-shaped negative electrode current collector 42 (e.g., a copper foil).

Any of conventional materials used for lithium-ion secondary batteries, either alone or in combination, may be used, without limitation, for the negative electrode active material constituting the negative electrode mixture layer. A preferable example is a particulate carbon material (carbon particles) at least partially containing a graphite structure (a layered structure). Also preferable are any of carbon materials including what is called graphite, hard carbons, soft carbons, and combinations thereof. For example, graphite particles of natural graphite may be used preferably.

Such a negative electrode active material is mixed typically with a binder and a conductive agent to form a negative electrode mixture composition, and the mixture is coated on the negative electrode current collector 42 and dried, whereby the negative electrode mixture layer 44 can be formed in a required portion of the current collector 42. For the binder and the conductive agent, the same ones as those used for the positive electrode mixture layer may be used. Although not particularly limited, the proportion of the negative electrode active material in the entire negative electrode mixture may be set to about 80 mass % or greater (e.g., from 80 mass % to 99 mass %), preferably about 90 mass % or greater (e.g., from 90 mass % t 99 mass %, and more preferably from 95 mass % to 99 mass %). In the composition that uses a binder, the proportion of the binder in the entire negative electrode mixture may be, for example, from about 0.5 mass % to about 10 mass %, generally preferably from about 1 mass % to 5 mass %.

The same type of material used for conventional lithium-ion secondary batteries may be used for the separators 13, which are used to be laminated with the positive and negative electrode sheets 12 and 14. A preferable example is a porous resin sheet (film) made of a polyolefin-based resin, such as polyethylene and polypropylene.

A portion in which no positive electrode mixture layer is provided and the positive electrode current collector 22 is exposed (i.e., a positive electrode mixture layer unformed portion) is provided at one edge of the current collector 22 that is along its longitudinal direction. Likewise, a portion in which no negative electrode mixture layer is provided and the negative electrode current collector 42 is exposed (i.e., a negative electrode mixture layer unformed portion) is provided at one edge of the current collector 42 that is along its longitudinal direction. As illustrated in FIG. 1, the positive and negative electrode sheets 12 and 14 are overlapped slightly staggered relatively to each other in the widthwise direction so that the two mixture layers 24 and 44 are overlapped and that the mixture-layer unformed portions of the two electrode sheets protrude respectively from one end of the separator 13 along its longitudinal direction and from the other end thereof. The lid 54 and the case main body 52 are connected respectively to the protruding portions.

The same type of non-aqueous electrolyte solution as used for conventional lithium-ion secondary batteries may be used, without limitation, as the electrolyte solution. Such a non-aqueous electrolyte solution typically has a composition in which an appropriate non-aqueous solvent contains a supporting salt. Examples of the non-aqueous solvent include ethylene carbonate (EC), propylene carbonate (PC), dimethyl carbonate (DMC), diethyl carbonate (DEC), ethyl methyl carbonate (EMC), 1,2-dimethoxyethane, 1,2-diethoxyethane, tetrahydrofuran, and 1,3-dioxolane, either alone or in combination. Examples of the supporting salt (supporting electrolyte) include lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$.

Second Embodiment

Figure 8:
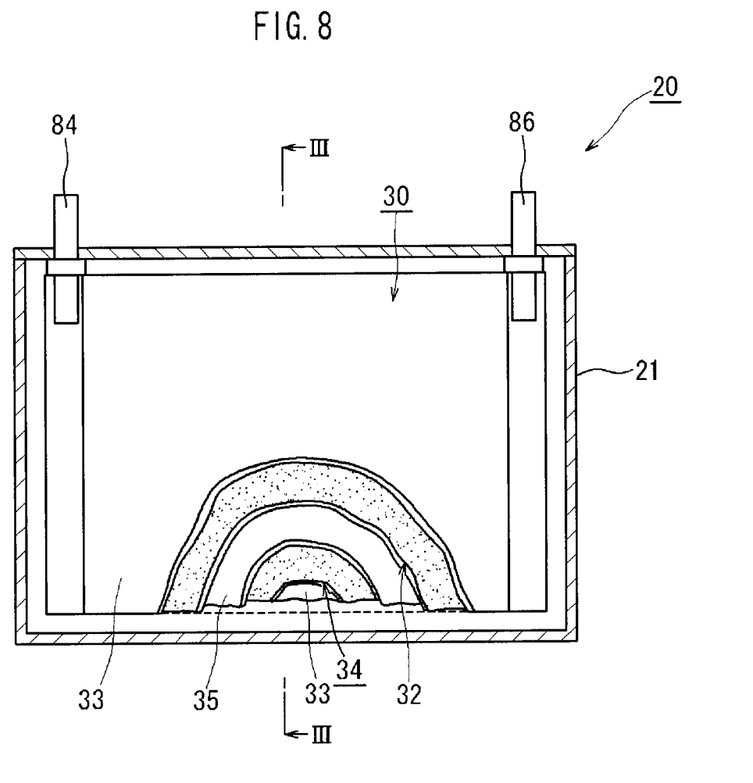
FIG. 8 is a schematic view illustrating a lithium-ion secondary battery according to a second embodiment.
Figure 9:
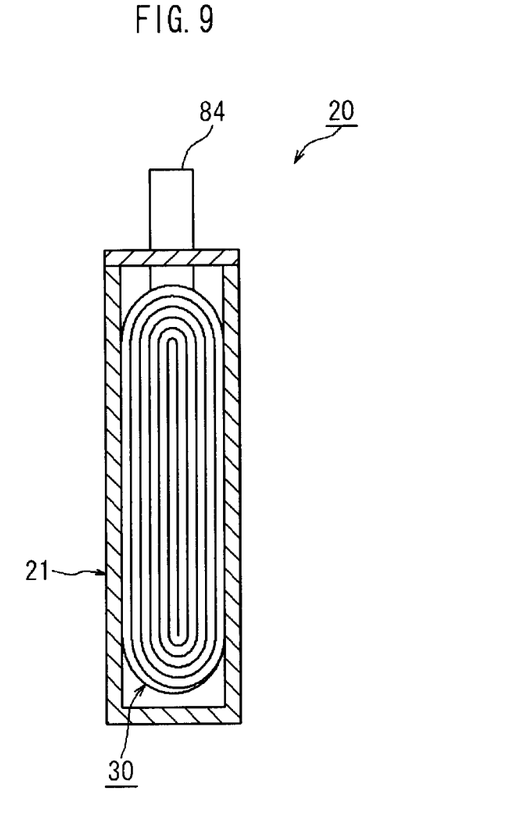
FIG. 9 is a schematic view illustrating a lithium-ion secondary battery according to the second embodiment.

FIGS. 8 and 9 show a schematic structure of a lithium-ion secondary battery according to a second embodiment. This lithium-ion secondary battery 20 has a flat, prismatic shaped container 21 (which is typically made of metal or may be made of a resin). A wound electrode assembly 30 is enclosed in the container 21. In the wound electrode body 30 of this embodiment, a positive electrode sheet 32, a negative electrode sheet 34, and two sheets of separators 33 and 35, which are made of the same kinds of materials as those in the first embodiment, are layered and wound together. At that time, the positive electrode sheet 32, the negative electrode sheet 34, and the two separators 33 and 35 are overlapped with each other so that the mixture-layer unformed portions of the two electrode sheets 32 and 34 protrude respectively from one end of the separator 33 along its longitudinal direction and from the other end thereof. Then, the wound assembly comprising the positive electrode sheet 32, the negative electrode sheet 34, and the two sheets of separators 33 and 35 is compressed sideward. Thereby, the wound electrode assembly 30 is formed in a flat shape corresponding to the shape of the container 21.

Here, a positive electrode terminal 84 and a negative electrode terminal 86 for external connection are electrically connected respectively to the electrode sheets 32 and 34. In this embodiment, portions of the positive electrode mixture layer unformed portions of the two electrode sheets 32 and 34 that protrude from the separators 33 are gathered in a radial direction of the wound electrode assembly 30, and to the gathered portions, the positive electrode terminal 84 and the negative electrode terminal 86 are connected (for example, welded). The wound electrode assembly 30 to which the terminals 84 and 86 are connected is enclosed in the container 21, and an appropriate non-aqueous electrolyte solution is filled therein. Thereafter, the container 21 is sealed to complete the lithium-ion secondary battery 20. Here, the non-aqueous electrolyte solution may be the same type of non-aqueous electrolyte solution as used in the first embodiment.

Third Embodiment

Figure 10:
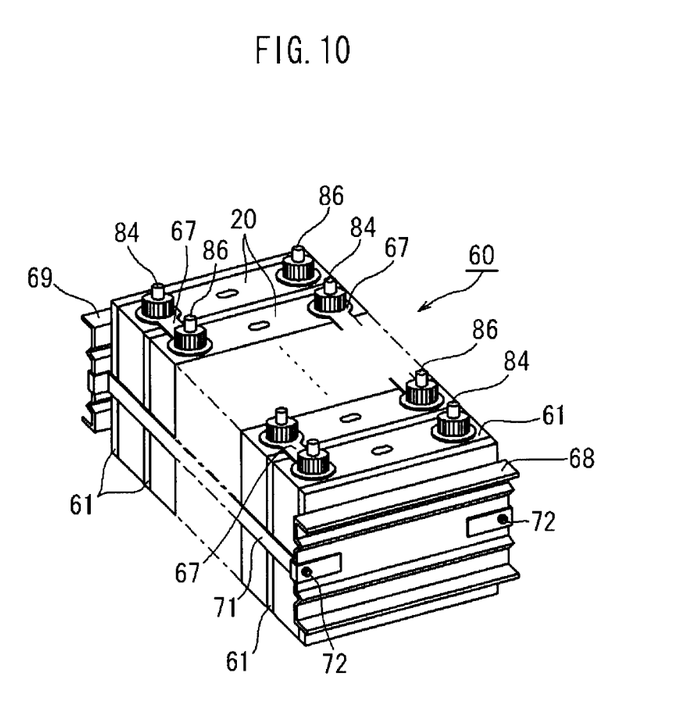
FIG. 10 is a schematic view illustrating a battery module according to a third embodiment.

FIG. 10 shows a schematic configuration of a battery module according to a third embodiment. This battery module 60 is constructed using a plurality of (typically 10 or more, and preferably 10 to 30, e.g., 20 herein) batteries 20 each made according to the second embodiment. These batteries 20 (cells) are arrayed one by one, each facing opposite directions so that the positive electrode terminals 84 and the negative electrode terminals 86 of the cells are alternately disposed next to each other and that the wide faces of the containers 21 of the cells face each other. In other words, they are arrayed so that the faces of the cells corresponding to the flat faces of the wound electrode assembly 30 enclosed in the container 21 are overlapped with each other. In addition, cooling plates 61 are disposed between the cells 20 and on the outermost sides of the array. The cooling plates 61 are disposed so as to be in close contact with the containers 21 of the respective cells 20. Each of the cooling plates 61 functions as a heat releasing member for efficiently dissipating the heat generated in the cells when in use. It has a shape such that fluid for cooling (typically air) can be introduced between the cells 20. An example of the shape such that fluid for cooling can be introduced may be such a shape that a plurality of parallel grooves extending from one side of a rectangular cooling plate 61 to the opposite side are provided in the surface. For such a cooling plate 61, it is possible to use a cooling plate made of, for example, a metal with good thermal conductivity, or a synthetic resin that is lightweight and hard, such as polypropylene.

A pair of end plates 68 and 69 are disposed on further outsides of the cooling plates 61 that are disposed on the outermost sides of the arrayed cells 20 and the cooling plates 61 (hereinafter these are collectively referred to as a "cell group"). In this way, the entire module (hereinafter also referred to as a "constrained body") including the cell group and the end plates 68 and 69 arrayed in a stacking direction of the cells 20 is constrained by constraining belts 71 for clamping, which are attached across the two end plates 68 and 69, at a predetermined confining pressure P in a stacking direction of the constrained body (that is, in a horizontal direction with respect to the axis of the wound electrode assembly 30). More specifically, the ends of the constraining belt 71 are screw-fastened to the end plates 68 and 69 by screws 72, whereby the constrained body is constrained so that a predetermined confining pressure P is applied in the stacking direction. For example, as the surface pressure that each of the wide faces of the container 21, it is recommended that the confining pressure P be from about 0.1 MPa to about 10 MPa. In the two adjacent cells 20, the positive electrode terminal 84 of one cell and the negative electrode terminal 86 of the other cell are electrically connected to each other by a connector 67. Thus, by connecting the cells 20 in series, a battery module 60 with a desired voltage is constructed.

Although the present invention has been described hereinabove, it should be understood that the foregoing embodiments are merely exemplary of the invention, and various modifications and alterations of the above-described examples are within the scope of the invention disclosed herein.

Figure 11:
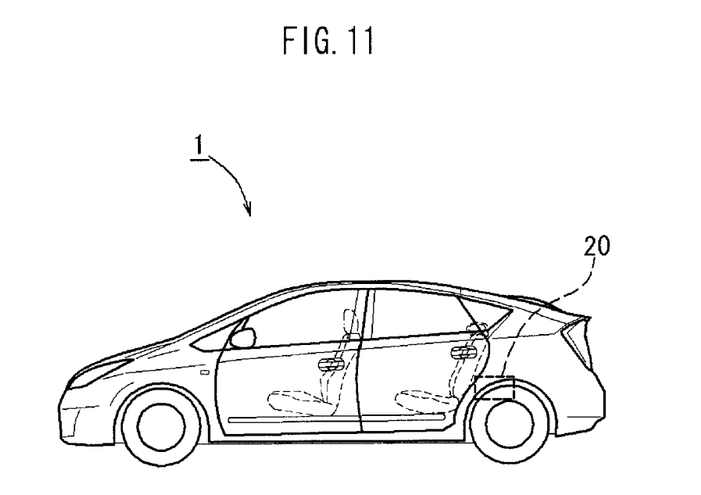
FIG. 11 is a schematic view illustrating a vehicle equipped with a lithium secondary battery as an electric power source.

The lithium secondary battery (typically lithium-ion secondary battery) provided by the techniques disclosed herein can be used as a lithium secondary battery for various purposes, since it exhibits excellent performance (including low reaction resistance and high durability). For example, it can be suitably used as an electric power source for the motor (electric motor) incorporated in vehicles, such as automobiles. Such a lithium-ion secondary battery may be used, as illustrated in FIG. 10, for example, in an embodiment of the battery module 60, in which a plurality of the batteries are connected in series or in parallel. In addition, as schematically illustrated in FIG. 11, a vehicle 1 can be provided in which such a lithium-ion secondary battery 20 (including the embodiment of a battery module) is equipped as an electric power source thereof. Examples of the vehicle 1 include automobiles, particularly the automobiles having an electric motor, such as hybrid electric vehicles, electric vehicles, and fuel cell vehicles.

REFERENCE SIGNS LIST

10—Lithium-ion secondary battery
11—Electrode assembly
12—Positive electrode sheet
13—Separator
14—Negative electrode sheet
15—Battery case
20—Lithium-ion secondary battery
21—Container
22—Current collector (positive electrode current collector)
24—Positive electrode mixture layer
30—Wound electrode body (electrode assembly)
32—Positive electrode sheet
33, 35—Separator
34—Negative electrode sheet
42—Negative electrode current collector
44—Negative electrode mixture layer
52—Case main body
54—Lid
60—Battery module
61—Cooling plate
67—Connector
68, 69—End plate
71—Constraining belt*
72—Screw
84—Positive electrode terminal
86—Negative electrode terminal
100—Lithium-transition metal composite oxide
110—Primary particle
120—Secondary particle
130—Closed pores
140—Cavities
200—Gas displacement-type pycnometer
212—Valve
214—Pipe
216—Sample chamber
218—Expansion chamber
220—Sample Rct—Reaction resistance
Rsol—Direct current resistance
$V_{cell}$—Volume of sample chamber
$V_{exp}$—Volume of expansion chamber
$V_{samp}$—Volume of sample

The invention claimed is:

1. A method of evaluating a positive electrode active material used for a lithium-ion secondary battery, the method comprising a density ratio-determining step of determining a ratio of an apparent density Da of the positive electrode active material to a theoretical density Db of the positive electrode active material.

2. The method of evaluating a positive electrode active material according to claim 1, wherein the apparent density Da is a density measured by a gas displacement-type pycnometer.

3. The method of evaluating a positive electrode active material according to claim 1, wherein the theoretical density Db is a density (Dbm/Dbv) obtained by dividing a mass Dbm per unit lattice volume of the positive electrode active material by the unit lattice volume Dbv of the positive electrode active material.

4. A method of manufacturing a lithium-ion secondary battery containing a positive electrode active material, the method comprising a step of verifying a ratio of an apparent density Da of the positive electrode active material to a theoretical density Db of the positive electrode active material is equal to or greater than a predetermined reference value.

5. The method of manufacturing a lithium-ion secondary battery according to claim 4, wherein the predetermined reference value is 0.90 with respect to the ratio (Da/Db) of the apparent density Da of the positive electrode active material to the theoretical density Db of the positive electrode active material.

6. A positive electrode active material for a lithium-ion secondary battery, wherein a ratio (Da/Db) of an apparent density Da to a theoretical density Db is equal to or greater than 0.90.

7. A lithium-ion secondary battery containing a positive electrode active material, the positive electrode active material having a ratio (Da/Db) of an apparent density Da to a theoretical density Db equal to or greater than 0.90.

* * * * *